United States Patent
Merriam

(10) Patent No.: US 8,514,433 B2
(45) Date of Patent: Aug. 20, 2013

(54) PRINT AND RELEASE PRINT CONTROL SYSTEM AND METHOD

(75) Inventor: Ray Uri Merriam, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 509 days.

(21) Appl. No.: 12/432,444

(22) Filed: Apr. 29, 2009

(65) Prior Publication Data

US 2010/0277756 A1 Nov. 4, 2010

(51) Int. Cl.
*G06F 3/12* (2006.01)
*G06K 15/00* (2006.01)

(52) U.S. Cl.
USPC .................. 358/1.15; 358/1.13; 358/1.14

(58) Field of Classification Search
USPC ............. 358/1.14, 1.15, 1.16, 1.18, 1.13; 235/380
See application file for complete search history.

(56) References Cited

U.S. PATENT DOCUMENTS

| 5,869,824 | A  | * | 2/1999  | Okada et al. ............... 235/380 |
| 6,476,927 | B1 | * | 11/2002 | Schwarz, Jr. ............. 358/1.15 |
| 2007/0127058 | A1 | * | 6/2007 | Eldridge .................. 358/1.15 |
| 2008/0055627 | A1 | * | 3/2008 | Ellis ......................... 358/1.14 |
| 2008/0263675 | A1 | * | 10/2008 | McIntyre .................... 726/28 |
| 2009/0033976 | A1 | * | 2/2009 | Ding ........................ 358/1.15 |

* cited by examiner

*Primary Examiner* — Marivelisse Santiago Cordero
*Assistant Examiner* — Moustapha Diaby
(74) *Attorney, Agent, or Firm* — Kermit D. Lopez; Luis M. Ortiz; Tuesday A. Kaasch

(57) ABSTRACT

A print and release print control system and method for optimizing network transmission and processing of rendering jobs. A document for rendering can be sent to a print driver and a print server specially programmed for performing a print and release operation. The print server includes a personal profile, a print job profile, and a profile associated with a network of rendering devices. The print server can send a job placeholder cover page to each of the designated rendering devices based on user preferences. The job placeholder cover page can be released from a selected rendering device by entering a secure release code. The print server can then detect the selected rendering device in which the cover page has been rendered and send the document to the selected printer. The print server can then clean up the cover pages sent to other printers if the submitted document is rendered.

15 Claims, 4 Drawing Sheets

PRINT AND RELEASE PRINT CONTROL SYSTEM AND METHOD

TECHNICAL FIELD

Embodiments are generally related to rendering devices, such as printers. Embodiments are also related to methods and systems for processing rendering jobs.

BACKGROUND OF THE INVENTION

Network printing systems generally include an assemblage of varying rendering devices, client computers, servers, and other components that are connected to and communicate over a network.

A rendering job can be assembled at the client computer and transmitted over the network to the server linked to a variety of rendering devices. The rendering job generally includes one or more electronically stored files and print attributes which inform the rendering devices how to process the files. The rendering device operating on a computer network may receive any number of simultaneous print requests. Because the rendering device can only produce one printed page at a time, each print request is intercepted and placed into an electronic holding bin often referred to as a print queue. A user, however, may desire to delete the print queue or resubmit the rendering job to another rendering device if the machine is broken, or someone else is rendering a very large job. Hence, special software must be installed on the rendering device operating system software to properly create and manage the print queues. Such an approach greatly limits the rendering devices that can be utilized within this solution to only those that actually are developed by a particular company or organization.

Based on the foregoing, it is believed that a need exists for an improved method and system for optimizing network transmission and processing of rendering jobs (e.g., print jobs), as described in greater detail herein. A need also exists for configuring print and release print control system.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved method and system for configuring a rendering device.

It is another aspect of the present invention to provide for improved method and system for optimizing network transmission and processing of rendering jobs.

It is yet a further aspect of the present invention to provide for an improved method for configuring print and release print control system.

The aforementioned aspects and other objectives and advantages can now be achieved as described herein. A print and release print control system and method for optimizing network transmission and processing of rendering jobs (e.g., print jobs) is disclosed herein. A document for rendering can be sent to a print driver and a print server specially programmed for performing the print and release process. The print server includes a personal profile, a print job profile, and a profile associated with a network of rendering devices. The print driver can be utilized to enter the personal and the print profile settings and provide feedback to a user based on the status of the document sent by the user.

The print server can send a job placeholder cover page to each of the designated multi-function devices or other appropriate rendering device based on user preferences. The user can release the job placeholder cover page from a selected rendering device by entering a secure release code. The print server can then detect the user-selected rendering device in which the cover page has been rendered and send the document to the user-selected rendering device. The print server can clean up the cover pages sent to other rendering devices if the document submitted by the user is rendered.

The print driver is an interface between the end user and the print and release print server. The personal profile can define the user's primary location, the number of rendering device for sending the cover page, and the rendering devices that are preferred by the user. The print job profile provides document specific settings. The print server also includes a process and method to queue the rendered document so that the print server can hold the document until the user-selected rendering device is known.

The print server also possesses the ability to generate the cover page, which can be sent to one or more rendering devices. The cover page file name can have user identifiable information so that the user can identify the cover page associated with the document. The print driver formats the document in order to render the document on many brands of rendering devices as possible. The print driver also includes a bi-directional print drive that provides feedback on the document sent to the rendering device. The print and release print process can be implemented at a very low cost making it more affordable to smaller businesses. The system enables users to get the jobs rendered to a variety of rendering devices in a timely manner with the least amount of frustration and effort. The system delivers a 'print here' type of solution at a very affordable cost and obtains a higher level of customer satisfaction. The cover page can also be utilized to release more than one document.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
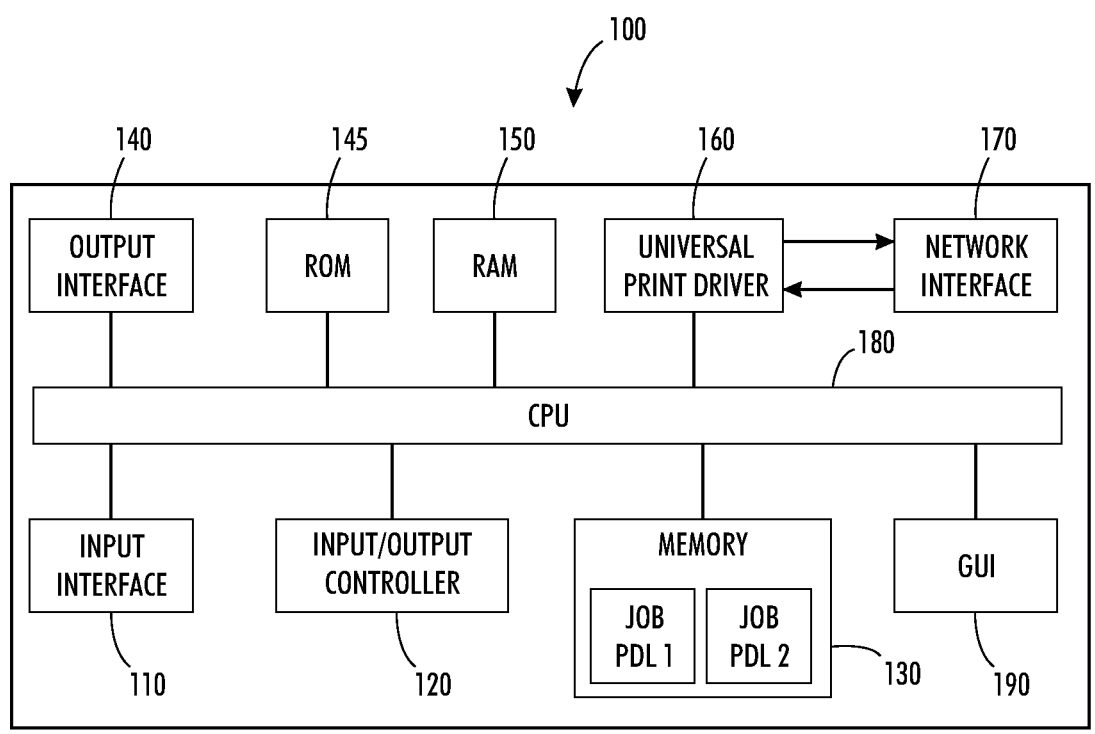
FIG. 1 illustrates a schematic view of a data-processing system in which the present invention may be embodied.
Figure 2:
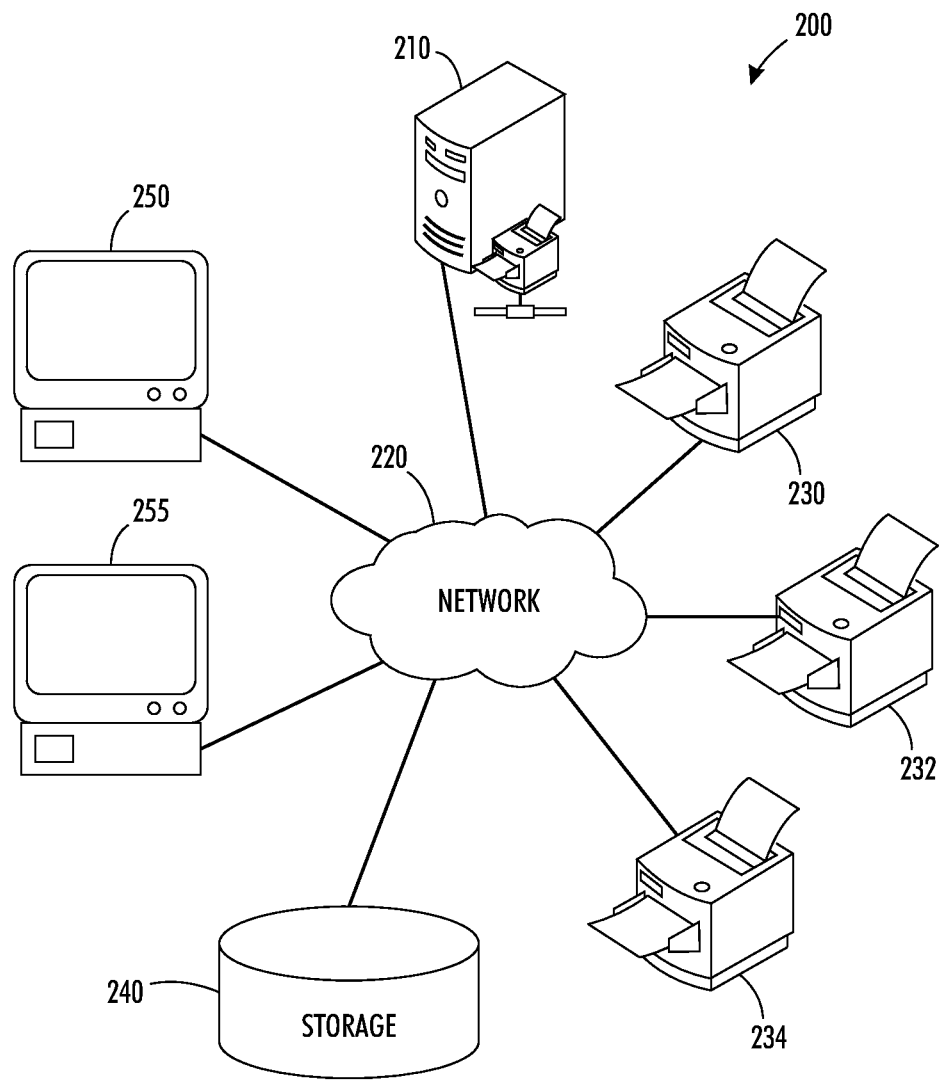
FIG. 2 illustrates a block diagram of a network rendering system for carrying out the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing apparatus 100 comprising an input interface 110 for receiving data, a CPU 180, a memory 130, and an output interface 140. Memory 130 can be implemented as a ROM 145, RAM 150, or a combination thereof, or simply a general memory unit. Data-processing apparatus 100 represents one of many possible data processing and/or computing devices, which can be utilized in accordance with the disclosed embodiments.

The interface 190, which is preferably a graphical user interface (GUI), also serves to display results, whereupon the user may supply additional inputs or terminate the session. The input interface 110, such as a keyboard, mouse, or another pointing device, can be connected to the CPU 180. One or more programs and data for processing a rendering job (e.g., print job) are stored in the ROM 145. The ROM 145 may be a rewritable ROM such as an EPROM. Data information can be stored in a software module, for example, a database in memory 130. Data-processing apparatus 100 includes a universal print driver 160 comprising instructions executing on the user terminal that generate page description language (PDL) data corresponding to the rendering job and describing content layout of one or more pages to be rendered. The PDL data describes the layout of each page of graphics, text, or other content to be rendered.

FIG. 2 illustrates a block diagram of a network rendering system 200, which can be implemented in accordance with a preferred embodiment. Note that in FIGS. 1-4, identical or similar blocks are generally indicated by identical reference numerals. Network rendering system 200 is a network of computers in which embodiments of the present invention may be implemented. Network data processing system 200 contains network 220, which is the medium used to provide communications links between various devices and computers connected together within network data processing apparatus 100. Network 220 may include connections such as wire, wireless communication links, or fiber optic cables. In the depicted example, print server 210 can be connected to network 220 along with storage unit 240.

In addition, end-user workstations 250 and 255 connect to network 220. These end-user workstations 250 and 255 may be, for example, personal computers or network computers. Data-processing system 100 depicted in FIG. 1 can be, for example, an end-user workstation such as end-user workstation 250 and 255. Alternatively, data-processing system 100 can be implemented as a print server such as print server 210, depending upon design considerations. The end-user workstation 250 and 255 enables a user to create, edit, or otherwise prepare or generate a document such as a word processing document, spreadsheet document, slideshow presentation document, desktop publishing document, or the like.

The printer server 210 can act as an operative communication medium between the user computer terminals 250 and 255 and the rendering devices 230, 232, 234, etc. The rendering system 200 may serve an office, a corporation, or the like, with rendering devices 230, 232, and/or 234 being distributed at various locations throughout a building, or otherwise remotely located. While three rendering devices are shown by way of example, it is to be appreciated that any number of rendering devices may be linked to the network such as two, four, six or more rendering devices. In general, the rendering devices 230, 232 and/or 234 can be utilized to perform a rendering output function (e.g., printing, scanning, copying, faxing, etc) within a networked environment. Note that rendering devices 230, 232, and 234 are generally analogous to one another. Similarly, computer terminals 250 and 255 are also similar to one another.

Preferably, rendering devices 230, 232 and 234 function as printers capable of rendering/printing The printer server 210 is capable of receiving documents for rendering from the user computer terminals 250 and 255 and selects destination network rendering devices 230, 232, and 234 for routing the documents based on user preferences. The computer terminals 250, 255, etc., can be, for example, any computing device capable of being integrated within a network such as a PDA, personal computer, cellular telephone, point-of-sale terminal, server, etc. The rendering devices 230, 232 and/or 234 can be located remotely with respect to each other, or alternatively, they may be located locally with respect to each other such as, for example, at a print shop or in an office environment. The printer server 210 can automatically select the destination rendering devices 230, 232 and/or 234 for routing the rendering job requests.

In the depicted example, print server 210 provides data such as boot files, operating system images, and applications to end-user workstations 250 and 255. End-user workstations 250 and 255 are clients to print server 210 in this example. Network rendering system 200 may include additional servers, end-user workstations, and other devices not shown. Specifically, end-user workstations may connect to any member of a network of servers, which provide equivalent content. FIG. 2 is intended as an example and not as an architectural limitation for different embodiments of the present invention.

The following description is presented with respect to embodiments of the present invention, which can be embodied in the context of a data-processing system such as data-processing system 100, network rendering system 200, and network 220 depicted respectively FIGS. 1-2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 3:
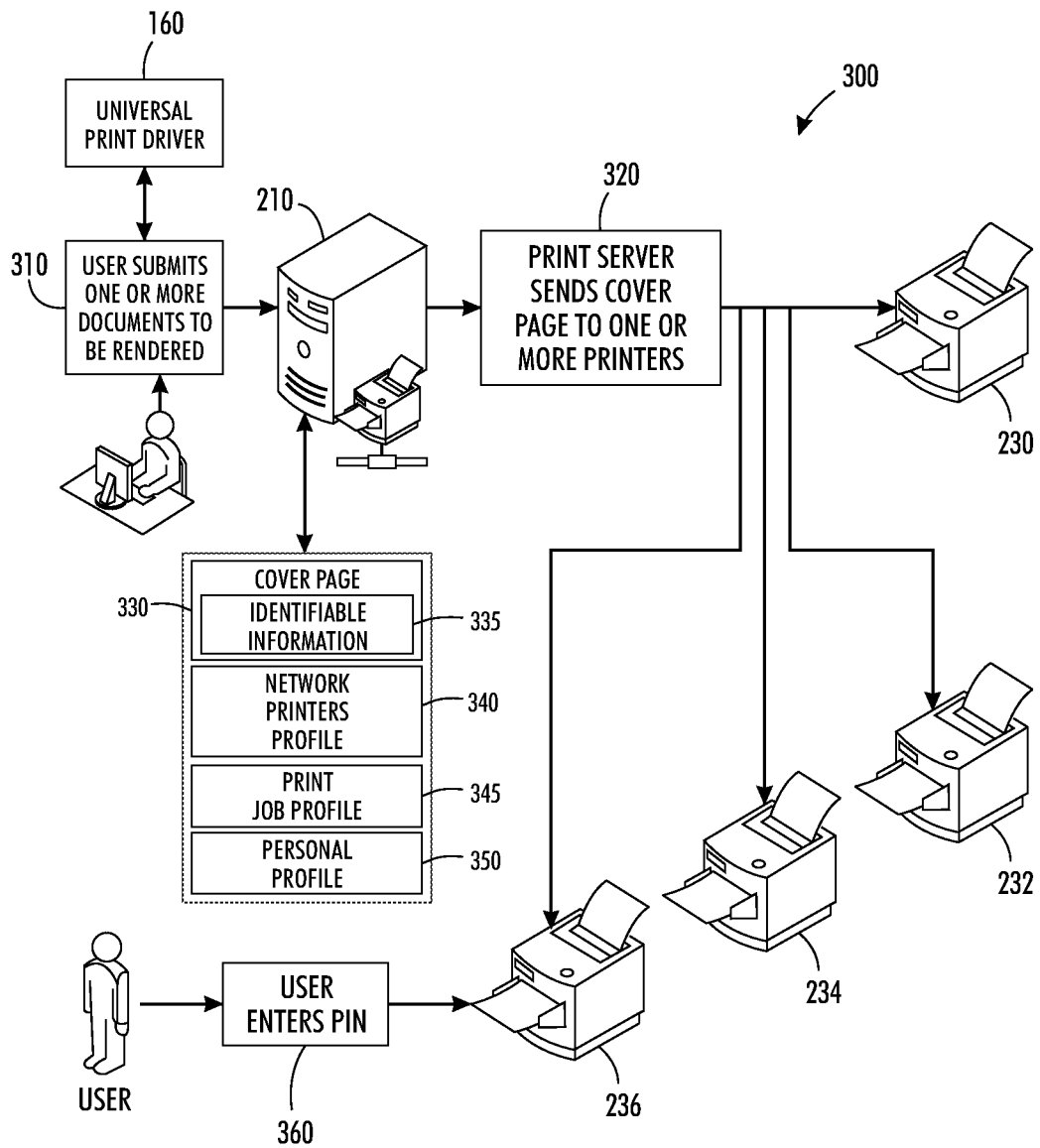
FIG. 3 illustrates a network flow diagram depicting print and release processes, in accordance with a preferred embodiment.

FIG. 3 illustrates a network flow diagram 300 depicting print and release functions, in accordance with a preferred embodiment. One or more documents for rendering (e.g., print job) can be sent by the user to the print driver module 160 and then to the print server 210 specially programmed for performing print and release processes, as indicated at block 310. The system 200 can be configured to include the universal print driver 160, the print server 210, and network rendering devices 230, 232, 234 and 236. The rendering devices 230, 232, 234 and 236 generally include features for secure rendering utilizing a 4 or 5 digit pin number. The rendering devices 230, 232, 234 and 236 utilize the print server 210 to examine a rendering job queue associated with the received rendering jobs. The rendering devices 230, 232, 234 and 236 allow an external entity to delete the rendering jobs that are waiting to be rendered. The rendering devices 230, 232, 234 and 236 do not require special hardware or software so that the number of rendering devices cannot be limited.

Note that as utilized herein, the term queue generally refers to a particular kind of collection in which the entities in the collection are kept in order and the principal (or only) operations on the collection are the addition of entities to the rear terminal position and removal of entities from the front terminal position. Such a queue can be provided in the context of a First-In-First-Out (FIFO) data structure. In such a FIFO data structure, the first element added to the queue will be the first one to be removed. This is equivalent to the requirement that whenever an element is added, all elements that were added before have to be removed before the new element can be invoked. Such a queue generally constitutes a linear data structure, although other types of data structures (e.g., circular) may be implemented. A "queue" as discussed herein can also be utilized to process various entities such as data, objects, or other events, which are stored and held to be processed later. In such a context, the queue can perform the function of a buffer. The "queue" described herein can also be implemented as a data structure coupled one or more access routines, as an abstract data structure or in an object-oriented language.

The print server 210 routes the rendering job to a single rendering device. The print server 210 can also reroute the rendering jobs to other rendering devices based on a set of rules. The print server 210 includes a personal profile 350 for each user in order to set up user preferences for processing the rendering job. The personal profile 350 can define the user's primary location, the number of rendering device for sending a cover page 330, and rendering devices that are preferred by the user. The print server 210 also includes a print job profile 345 that provides document specific settings. The print job profile 345 can identify user desired printing parameters and optional settings. For example, the print job profile 345 identifies whether the document is rendered on a color printer or the document is rendered on a black only printer. The print server 210 also includes a profile 340 of the network rendering devices 230, 232, 234 and 236 and the relationship to each other. For example, the relationship can be depicted as a network map such that if the user is in location X, the print server 210 identifies that there are N number of rendering devices in that location. The profile 340 also identifies rendering capabilities associated with the rendering devices 230, 232, 234 and 236.

The print server 210 can further process instructions for queuing the rendered documents so that print server 210 can maintain the documents until the print server 210 "knows" which rendering device the user desires that the document be printed. The print server 210 possesses the ability to generate the cover page 330 and send the cover page 330 to one or more rendering devices 230, 232, 234 and 236. A file name related to the cover page 330 can include user identifiable information 335 so that the user is aware of the cover page 330 associated with their documents. The file name related to the cover page 330 also includes identifiable information 335 to identify the rendering job related to each user, when the print server 210 receives a list of rendering jobs in each printer's print queue. The print server 210 can also be configured to perform such functions based on the printer brand and model.

The print driver 160 is generally configured as the interface between the end user and the print and release print server 210. The print driver 160 receives and formats the document (s) in such a manner that the documents are capable of being rendered by as many different types of rendering devices as possible. The print driver 160 provides feedback to the user (s), wherein such feedback relates to the status of the documents sent by the user. The print driver 160 can be utilized to enter the settings related to the personal profile 350 and the print job profile 345. The print driver 160 also includes a bi-directional print driver that provides feedback about particular rendering jobs sent to a particular rendering device.

The print server 210 is also generally configured to send the job placeholder cover page 330 to each of the designated rendering devices 230, 232, 234 and 236, as illustrated at block 320. The user can release the job placeholder cover page 330 from any one of the rendering devices such as the rendering device 236 by entering a secure print pin number, as depicted at block 360. The security print pin number may be, for example, a secret numeric password shared between the user and the rendering device 236. Such a security pin print number may be utilized to authenticate the user with respect to the rendering device 236. The print server 210 can then detect the rendering device 236 in which the cover page 330 has been rendered and can then send the documents to the rendering device 236. The print server 210 can also be configured to "clean up" the cover page 330 sent to other rendering devices 230, 232, and 234, if the documents submitted by the user(s) are rendered.

Figure 4:
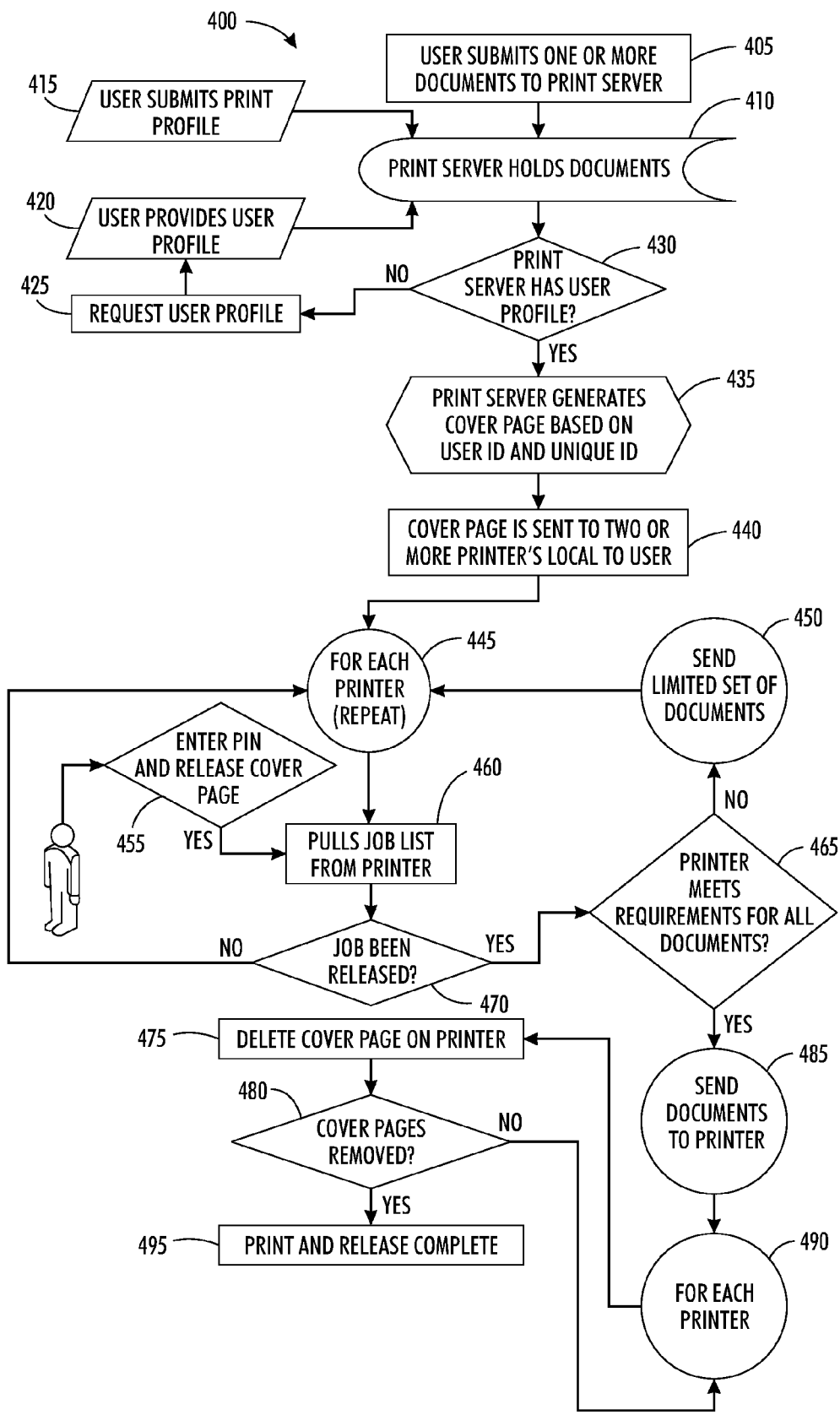
FIG. 4 illustrates a detailed flow chart of operations illustrating logical operational steps of a method for optimizing network transmission and processing of rendering job, in accordance with a preferred embodiment.

FIG. 4 illustrates a detailed flow chart of operations illustrating logical operational steps of a method 400 for optimizing network transmission of rendering job, in accordance with a preferred embodiment. The user can submit one or more documents to the print server 210, as illustrated at block 405. The print server 210 can hold the documents that are to be rendered, as depicted at block 410. The print server 210 can receive the print job profile 345 and the user profile 350 from the user, as illustrated at blocks 415 and 420 respectively. The user profile 350 can be utilized to determine user's preferences for rendering the document and the print job profile 345 provides document specific settings. Next, a determination can be made whether the print server 210 has received the user profile 350, as indicated at block 430. If the print server 210 does not receive the user profile 350, a request for the user profile 350 can be made, as depicted at block 425.

Upon receiving the user profile 350, the cover page 330 can be generated by the print server 210 based on user's ID and unique ID, as indicated at block 435. The cover page 330 can then be sent to the rendering devices 230, 232, 234 and 236 local to the user, as illustrated at block 440. The cover page 330 can be released from any selected printing device 236 in the network by entering the security print pin number, as indicated at block 455. Next, pull the job list from the selected printing device 236, as depicted at block 460. Thereafter, a determination can be made whether the job has been released, as illustrated at block 470.

If the job is not released, then the print server 210 sends the cover pages 330 to each printing device 230, 232, 234 and 236, as indicated at block 445. When the job is released, a determination can be made as to whether the selected printing device 236 meets all the requirements to render all the documents, as depicted at block 465. If the printing device 236 does not meet the requirements, then a limited set of documents that satisfies the requirements can be sent to the selected printer 236, as illustrated at block 450. Thereafter, the print server 210 can send the cover pages 330 once again to all the printing devices 230, 232, 234 and 236 to render the remaining documents, as indicated at block 445. Note that one cover page is also capable of releasing more than one document.

If the rendering device 236 meets the requirements, the documents can be sent to the selected rendering device 236, as depicted at block 485. Next, as illustrated at block 475, the cover pages 330 sent to each rendering devices 230, 232, 234 can be removed. Thereafter, an operation can be processed, as indicated at block 480, to determine if all the cover pages 330 have been removed. If the cover pages 330 are not removed, then the cover pages 330 can be deleted from each printing device 230, 232, and 234, as depicted at block 475. If the cover pages 330 are removed, the print and release print functions can be completed, as illustrated at block 495. The method 400 described herein does not require the rendering devices 230, 232, 234 and 236 to have externally attached control devices or special software in order to allow the documents to be released to a variety of rendering devices. The print and release print control method 400 described herein can be implemented at a very low cost, thereby making it more affordable to smaller businesses or businesses that need to keep costs down.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

The print server 210 monitors the rendering devices 230, 232, 234 and 236, detects the release request at the chosen rendering device and deletes the remaining job placeholder cover page jobs at other rendering devices. The system 200 enables jobs to be rendered in a timely manner with the least amount of frustration and effort. The system 200 also delivers a 'print here' type of solution at a very affordable cost, without putting a major restriction on the rendering devices 230, 232, 234 and 236. The system 200 is additionally capable of offering a higher level of customer satisfaction by making it easier for a user(s) to obtain the rendered document(s), even if the user(s) is located in a remote location.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A secure printing method, comprising:
submitting at least one cover page associated with at least one document to a plurality of designated rendering devices based on a preference designated in at least one print profile;
transmitting said at least one document to a print server via a print driver, wherein said print server includes said at least one print profile for performing a print and release operation with respect to said at least one document, a personal profile containing user specific rendering preferences and a primary location for said user, and a profile containing a network map of said plurality of designated rendering devices and rendering capabilities for each of said plurality of said designated rendering devices;
providing feedback of status of said at least one document utilizing said print driver;
releasing said at least one cover page to a selected rendering device by inputting a secure release code to said selected rendering device; and
detecting said selected rendering device in order to thereafter release said at least one document automatically to said selected rendering device and provide a secure transmission of said at least one document in a timely manner;
configuring said print server to generate said at least one cover page, wherein a file name associated with said at least one cover page comprises user-identifiable information that identifies said at least one cover page associated with said at least one document.

2. The method of claim 1 further comprising deleting said at least one cover page sent to other rendering devices, if said at least one document submitted is rendered.

3. The method of claim 1 further comprising configuring said at least one print profile associated with said print server to further comprise a personal profile that includes at least one of the following types of information:
a user primary location;
a count related to said plurality of rendering device with respect to said at least one cover page; and
a preferred rendering device.

4. The method of claim 1 further comprising modifying said at least one print profile associated with said print server to provide at least one document specific setting.

5. The method of claim 1 configuring said at least one print profile associated with said print server to further comprise a profile associated with said plurality of rendering devices.

6. The method of claim 1 further comprising configuring said print server to queue said at least one document so that said print server is capable of holding said at least one document until a preferred rendering device is recognized.

7. A secure printing system, comprising:
a processor;
a data bus coupled to said processor; and
a computer-usable medium embodying computer code, said computer-usable medium being coupled to said data bus, said computer program code comprising instructions executable by said processor and configured for:
submitting at least one cover page associated with at least one document to a plurality of designated rendering devices based on a preference designated in at least one print profile;
transmitting said at least one document to a print server via a print driver, wherein said print server includes said at least one print profile for performing a print and release operation with respect to said at least one document, a personal profile containing user specific rendering preferences and a primary location for said user, and a profile containing a network map of said plurality of designated rendering devices and rendering capabilities for each of said plurality of said designated rendering devices;
providing feedback of status of said at least one document utilizing said print driver;
releasing said at least one cover page to a selected rendering device by inputting a secure release code to said selected rendering device; and
detecting said selected rendering device in order to thereafter release said at least one document automatically to said selected rendering device and provide a secure transmission of said at least one document in a timely manner;
wherein said instructions are further configured for modifying said print server to generate said at least one cover page, wherein a file name associated with said at least one cover page comprises user-identifiable information that identifies said at least one cover page associated with said at least one document.

8. The system of claim 7 wherein said instructions are further configured for deleting said at least one cover page sent to other rendering devices, if said at least one document submitted is rendered.

9. The system of claim 7 wherein said instructions are further configured for modifying said at least one print profile associated with said print server to further comprise a personal profile that includes at least one of the following types of information:
- a primary location of a user;
- a count related to said plurality of rendering device with respect to said at least one cover page; and
- a preferred rendering device.

10. The system of claim 7 wherein said instructions are further configured for modifying said at least one print profile associated with said print server to provide at least one document specific setting.

11. The system of claim 7 wherein said instructions are further configured for modifying said at least one print profile associated with said print server to further comprise a profile associated with said plurality of rendering devices.

12. The system of claim 7 wherein said instructions are further configured for modifying said print server to queue said at least one document so that said print server is capable of holding said at least one document until a preferred rendering device is recognized.

13. A non-transitory computer-usable medium for secure printing, said computer-usable medium embodying computer program code, said computer program code comprising computer executable instructions configured for:
- transmitting at least one document to a print server via a print driver, wherein said print server includes said at least one print profile for performing a print and release operation with respect to said at least one document, a personal profile containing user specific rendering preferences and a primary location for said user, and a profile containing a network map of said plurality of designated rendering devices and rendering capabilities for each of said plurality of said designated rendering devices;
- providing feedback of status of said at least one document utilizing said print driver;
- generating at least one cover page associated with at least one document utilizing said print server;
- submitting at least one cover page associated with at least one document to a plurality of designated rendering devices based on a preference designated in at least one print profile;
- releasing said at least one cover page to a selected rendering device by inputting a secure release code to said selected rendering device; and
- detecting said selected rendering device in order to thereafter release said at least one document automatically to said selected rendering device and provide a secure transmission of said at least one document in a timely manner;
- configuring said print server to generate said at least one cover page, wherein a file name associated with said at least one cover page comprises user-identifiable information that identifies said at least one cover page associated with said at least one document.

14. The non-transitory computer-usable medium of claim 13 wherein said embodied computer program code further comprises computer executable instructions configured for deleting said at least one cover page sent to other rendering devices, if said at least one document submitted is rendered.

15. The non-transitory computer-usable medium of claim 13 wherein said embodied computer program code further comprises computer executable instructions configured for modifying said at least one print profile associated with said print server to further comprise a personal profile that includes at least one of the following types of information:
- a user primary location;
- a count related to said plurality of rendering device with respect to said at least one cover page; and
- a preferred rendering device.

* * * * *